United States Patent
Hartmann et al.

[11] 3,722,493
[45] Mar. 27, 1973

[54] ROTARY PISTON INTERNAL COMBUSTION ENGINE

[76] Inventors: Hans Otto Hartmann, Wurttembergstasse 110, Stuttgart-Unterturkheim; Karl-Walter Schmidt, Kappelbergweg 14, Beutelsbach, both of Germany

[22] Filed: Mar. 10, 1971

[21] Appl. No.: 122,691

[30] Foreign Application Priority Data

Mar. 11, 1970 Germany..................P 20 11 574.6

[52] U.S. Cl. ....................123/8.07, 60/313, 418/61
[51] Int. Cl..............................................F02b 53/00
[58] Field of Search..........123/8.07, 8.01, 8.09, 8.13, 123/8.45; 418/61; 417/308–311; 60/313, 323

[56] References Cited

UNITED STATES PATENTS

| | | | |
|---|---|---|---|
| 1,367,591 | 2/1921 | Duncombe | 123/8.07 |
| 3,507,261 | 4/1970 | Myers et al. | 123/119 A |
| 1,686,767 | 10/1928 | Saxon | 123/8.07 |
| 3,428,052 | 1/1969 | Miller | 60/323 |
| 3,546,878 | 12/1970 | Yoshimura | 123/8.45 |

Primary Examiner—C. J. Husar
Attorney—Craig, Antonelli, Stewart & Hill

[57] ABSTRACT

A rotary piston internal combustion engine, particularly of trochoidal construction, which is composed of at least two units, each including a piston and a housing casing, and in which both the inlet channel as also the exhaust channel are arranged in each unit within the area of a zone of the housing casing near the engine axis; the exhaust pipes connected to each exhaust channel are combined at substantially the same height into a common pipe which provides an afterburning effect for the exhaust gases.

28 Claims, 4 Drawing Figures

PATENTED MAR 27 1973 3,722,493

INVENTORS
HANS OTTO HARTMANN
KARL-WALTER SCHMIDT

BY Craig, Antonelli, Stewart & Hill
ATTORNEYS

ROTARY PISTON INTERNAL COMBUSTION ENGINE

The present invention relates to a rotary piston internal combustion engine, especially of trochoidal type of construction, which is composed of at least two units, each including a piston and a housing casing, and in which both the inlet channel as also the outlet channel are arranged in each unit with the area of a zone of the housing casing in proximity to the axis.

The present invention is concerned with the task to achieve with structurally simple means an afterburning of the exhaust gases leaving the internal combustion engine in the interest of an exhaust gas composition that is as free of noxious or harmful components as possible. The underlying problems are solved according to the present invention in that the exhaust pipes connected to each outlet channel terminate, combined at the same height, in an adjoining common pipe or manifold.

It is achieved by the present invention that with an internal combustion engine constructed of at least two units the already present, alternate outflow of the exhaust gases from these units is utilized to create a vacuum in the inlet channel of a unit with a respective weaker flow component, in which the piston in the lower dead-center position stands in the cross-over position, which vacuum has as a consequence that in this unit fresh air or possibly also a fresh air-fuel mixture is sucked out of the inlet channel past the piston into the exhaust channel.

Still in the exhaust channel, where high temperatures prevail, the fresh air or the fresh fuel-air mixture reacts with the exhaust gases in the sense of an afterburning so that finally exhaust gases flow out of the common pipe in which practically no poisonous components are present any longer.

In an advantageous construction of the present invention, the exhaust pipes can be constructed relatively short and the transition from the exhaust pipes to the common or collecting pipe can be located near the internal combustion engine so that sufficient heat energy is still present in the exhaust gases for the afterburning. For the same purpose, the exhaust pipes may be constructed heat-insulated up to the common pipe whereby they may be provided, for example, with an asbestos insulation or with a conventional heat shield. However, they may also be constructed as double-walled pipes or other conventional heat-flow barriers may be provided.

Structurally and functionally advantageous, the connection of the common pipe to the exhaust pipes may be constructed as bifurcation or Y-section which serves simultaneously as eddying space and combustion chamber. Furthermore, air inlet apertures may be provided at the transition from the exhaust pipes to the common pipe in order to favor the afterburning by the supply of additional air.

A connection between the inlet channel and the exhaust channel or the expansion chamber may be provided in each unit within the housing casing within the area of the exhaust channel, whose inlet cross section is disposed in the inlet channel upstream of a throttle valve arranged therein. It is possible thereby to draw in still more fresh air or fresh fuel air mixture for the afterburning. In order to prevent a return flow, a check valve or a throttle of any conventional construction may be arranged in the connection.

Accordingly, it is an object of the present invention to provide a rotary piston internal combustion engine which avoids by simple means the aforementioned shortcomings and drawbacks encountered in the prior art.

Another object of the present invention resides in a rotary piston internal combustion engine consisting of several units, in which the exhaust gases are freed from harmful components.

A further object of the present invention resides in a rotary piston internal combustion engine of trochoidal construction in which the exhaust pipes of two or more units are combined into a common exhaust pipe which serves as afterburner.

Another object of the present invention resides in a rotary piston internal combustion engine of trochoidal construction in which each engine consists of at least two units and in which the exhaust pipes of the units are connected to a common exhaust pipe that not only serves as combustion chamber, but also as eddying chamber for the afterburning.

These and further objects, features and advantages of the present invention will become more obvious from the following description when taken in connection with the accompanying drawing which shows, for purposes of illustration only, one embodiment in accordance with the present invention and wherein.

Figure 1:
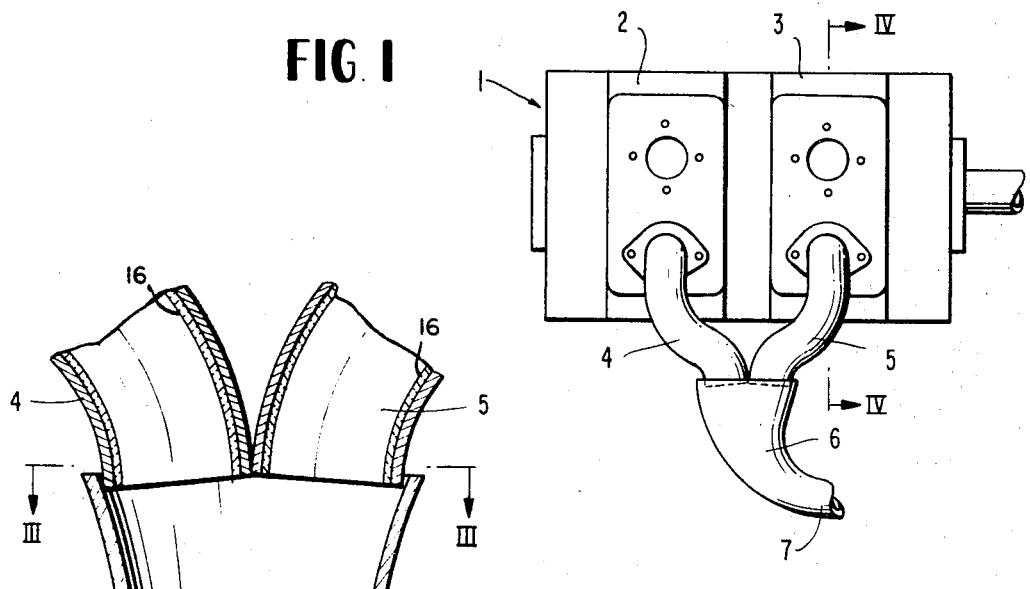
FIG. 1 is an elevational view of a rotary piston internal combustion engine in accordance with the present invention.

Referring now to the drawing wherein like reference numerals are used throughout the various views to designate like parts, the rotary piston internal combustion engine 1 illustrated in FIG. 1 is of a trochoidal type of construction and essentially consists of two units 2 and 3, each including a piston and a housing casing. Exhaust pipes 4 and 5 are flangedly connected to the exhaust channels of these two units 2 and 3, which combined at the same height terminate in a Y-section 6 of a common pipe 7.

The exhaust pipes 4 and 5 are constructed relatively short so that the bifurcation 6 is disposed near the outlet of the internal combustion engine 1. Heat insulation, schematically illustrated at 17, may be provided in pipes 4 and 5.

Figure 2:
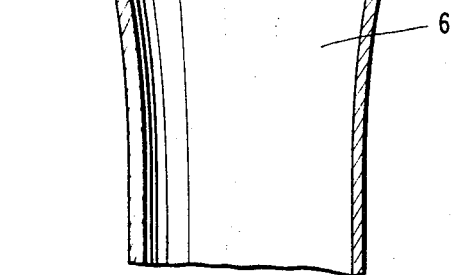
FIG. 2 is a partial longitudinal cross-sectional view, on an enlarged scale, through the exhaust pipes of the internal combustion engine within the area of the transition to the common pipe in accordance with the present invention.
Figure 3:
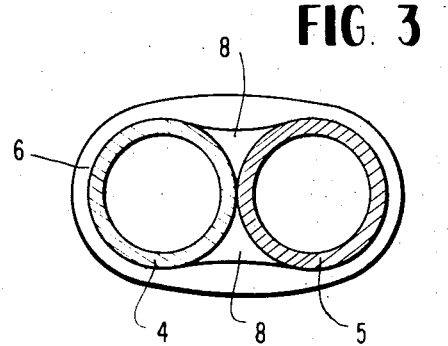
FIG. 3 is a cross-sectional view taken along the line III—III of FIG. 2.

As can be seen more fully from FIGS. 2 and 3, the exhaust pipes 4 and 5 terminate flush adjacent one another in the Y-section 6 which forms a transition between the exhaust pipes 4 and 5 and the common pipe 7. The end face of the Y-section 6 is thereby covered off in such a manner that air inlet apertures 8 (FIG. 3) remain between the exhaust pipes 4 and 5.

Figure 4:
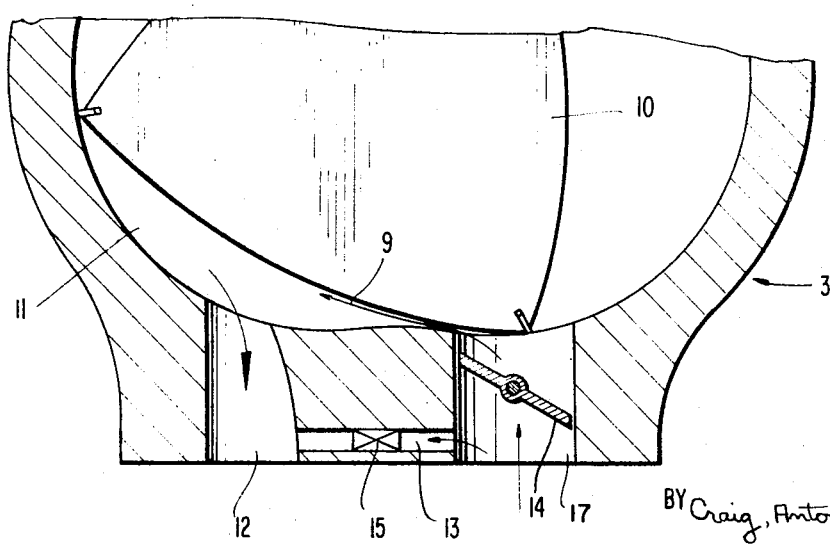
FIG. 4 is a partial cross-sectional view through the internal combustion engine taken along line IV—IV of FIG. 1.

During operation of the internal combustion engine in which in a conventional manner the piston in the unit 2 operates phase-displaced to the piston in the unit 3, it is achieved by the arrangement according to FIGS. 1 to 3 that the alternate outflow of the exhaust gases out of the exhaust channels of the units 2 and 3 produces, respectively, in the other exhaust channel a vacuum which, according to FIG. 4, causes an overflowing of fresh air and/or a fresh fuel air mixture out of the inlet channel 17 in the direction of arrow 9 past the piston 10 into the expansion chamber 11 and from there into the exhaust channel 12. In the exhaust channel 12 where high temperatures prevail, the fresh air or the fresh fuel-air mixture reacts with the exhaust gases in the sense of an afterburning. This afterburning is additionally enhanced by the air which is sucked in through the openings 8 in the Y-section 6. The air or the mixture flowing in the direction of arrow 9 not only enhances an afterburning of the exhaust gases, but it also forms a barrier against exhaust gases which seek to flow over from the expansion chamber 11 into the suction chamber of the corresponding unit.

In order to increase the air quantity for the afterburning, according to FIG. 4, a connecting line 13 is provided between the inlet channel 17 and the exhaust channel 12. The inlet cross-section of this connecting line is located in the inlet channel 17 upstream of the throttle valve 14. A check valve 15 in the connecting line 13 prevents a return flow.

In addition to the exhaust pipes 4 and 5, possibly also the Y-section 6 and the common pipe 7 may be constructed heat-insulated.

While we have shown and described only one embodiment in accordance with the present invention, it is understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A rotary piston internal combustion engine comprising: at least two units which each include a piston means and a housing casing means, an inlet channel and an exhaust channel arranged in each unit, separate exhaust pipe means connected to the respective exhaust channels, and common exhaust pipe means interconnecting said separate exhaust pipe means to one another downstream of said outlet channels such that a relatively strong exhaust flow in one of said separate exhaust pipe means creates an exhaust gas suction in the other of said separate exhaust pipe means for enhancing a relatively weak exhaust flow in said other of said separate exhaust pipe means, said engine operating cycle being such that said separate exhaust pipe means alternately experience relatively weak and strong exhaust flows.

2. A rotary piston internal combustion engine according to claim 1, characterized in that said exhaust pipe means terminate in said common pipe means substantially at the same height.

3. A rotary piston internal combustion engine according to claim 2, characterized in that the engine is of trochoidal type of construction.

4. An internal combustion engine according to claim 1, characterized in that the separate exhaust pipe means are of relatively short construction and the transition from the separate exhaust pipe means to the common exhaust pipe means is disposed near the internal combustion engine.

5. An internal combustion engine according to claim 4, characterized in that the separate exhaust pipe means are constructed heat-insulated up to the common exhaust pipe means.

6. An internal combustion engine according to claim 5, characterized in that the connection of the common exhaust pipe means with the separate exhaust pipe means is constructed as a Y-section.

7. An internal combustion engine according to claim 6, characterized in that air inlet apertures are provided at the transition from the separate exhaust pipe means to the common exhaust pipe means for admitting outside air to the exhaust flow.

8. An internal combustion engine with an expansion chamber according to claim 7, characterized in that in each unit within the respective housing casing means, a connection is provided between the inlet channel and one of the two parts consisting of exhaust channel and expansion chamber within the area of the exhaust channel, the inlet cross section of said connection being disposed in the inlet channel upstream of a throttle valve arranged therein.

9. An internal combustion engine according to claim 8, characterized in that a check valve means is provided in the connection.

10. An internal combustion engine according to claim 8, characterized in that a throttle is provided in said connection.

11. A rotary piston internal combustion engine according to claim 8, characterized in that said separate exhaust pipe means terminate in said common exhaust pipe means substantially at the same height.

12. A rotary piston internal combustion engine according to claim 11, characterized in that the engine is of trochoidal type of construction.

13. An internal combustion engine according to claim 1, characterized in that the separate exhaust pipe means are constructed heat-insulated up to the common exhaust pipe means.

14. An internal combustion engine according to claim 1, characterized in that the connection of the common exhaust pipe means with the separate exhaust pipe means is constructed as a Y-section.

15. An internal combustion engine with an expansion chamber according to claim 1, characterized in that in each unit within the respective housing casing means, a connection is provided between the inlet channel and one of the two parts consisting of exhaust channel and expansion chamber within the area of the exhaust channel, the inlet cross section of said connection being disposed in the inlet channel upstream of a throttle valve arranged therein.

16. An internal combustion engine according to claim 15, characterized in that a check valve means is provided in the connection.

17. An internal combustion engine according to claim 15, characterized in that a throttle is provided in said connection.

18. An engine according to claim 1, wherein said piston means and inlet channel for each unit are positioned such that the separate exhaust pipe means of a unit communicates around the piston means directly with the inlet channel of said unit during at least a portion of the engine operating cycle when said respective exhaust pipe means is experiencing the relatively weak exhaust flow, whereby the enhancement of the relatively weak exhaust flow operates to draw air from the inlet channel to the exhaust channel to enhance the afterburning of the exhaust gases in said respective exhaust pipe means.

19. An engine according to claim 1, wherein air inlet means are provided adjacent the interconnection of said separate exhaust pipe means and said common exhaust pipe means for adding outside air to the exhaust flow through said common exhaust pipe means.

20. An engine according to claim 18, wherein air inlet means are provided adjacent the interconnection of said separate exhaust pipe means and said common exhaust pipe means for adding outside air to the exhaust flow through said common exhaust pipe means.

21. An engine according to claim 19, wherein said separate exhaust pipe means merge in a parallel abutting arrangement adjacent the ends thereof which communicate with said common exhaust pipe means.

22. An engine according to claim 21, wherein said air inlet means are formed in part by the outer abutting walls of said separate exhaust pipe means.

23. An engine according to claim 21, wherein the common exhaust pipe means has an opening accepting said separate exhaust pipe means, said opening being larger in cross-section than the cross-section of the ends of said separate exhaust pipe means so as to form said air inlet means around the outside of said separate exhaust pipe means.

24. An engine according to claim 18, wherein said separate exhaust pipe means merge in a parallel abutting arrangement adjacent the ends thereof which communicate with said common exhaust pipe means.

25. An engine according to claim 24, wherein said air inlet means are formed in part by the outer abutting walls of said separate exhaust pipe means.

26. An engine according to claim 24, characterized in that the connection of the common exhaust pipe means with the separate exhaust pipe means is constructed as a Y-section.

27. An engine according to claim 18, Characterized in that the connection of the common exhaust pipe means with the separate exhaust pipe means is constructed as a Y-section.

28. An engine according to claim 26, characterized in that the connection of the common exhaust pipe means with the separate exhaust pipe means is constructed as a Y-section.

* * * * *